United States Patent Office 3,449,166
Patented June 10, 1969

3,449,166
PROCESS FOR THE PRODUCTION OF FILLING MATERIALS FOR GALVANIC ELEMENTS
Otto Jache, Budingen, Oberhessen, Germany, assignor to Accumulatorenfabrik Sonnenschein G.m.b.H., Budingen, Oberhessen, Germany, a limited-liability company of Germany
Filed Mar. 6, 1967, Ser. No. 620,955
Claims priority, application Germany, Mar. 8, 1966, A 51,787
Int. Cl. H01m 39/06, 35/04
U.S. Cl. 136—27   6 Claims

ABSTRACT OF THE DISCLOSURE

A process for producing filling materials for grids of batteries or accumulators in which pulverized reaction material, such as ball-milled lead powder, is introduced into a reaction vessel to form a bed at the bottom of the vessel, sulfuric acid is sprayed onto this bed, and compressed air is simultaneously fed from the bottom of the vessel through the bed. The lead and sulfuric acid react to generate heat which changes the water in the reaction material and that in the sulfuric acid into steam. The compressed air drives off the steam through an outlet in the top of the vessel. Heat can be supplied from the outside to the vessel if necessary.

---

Figure 1:
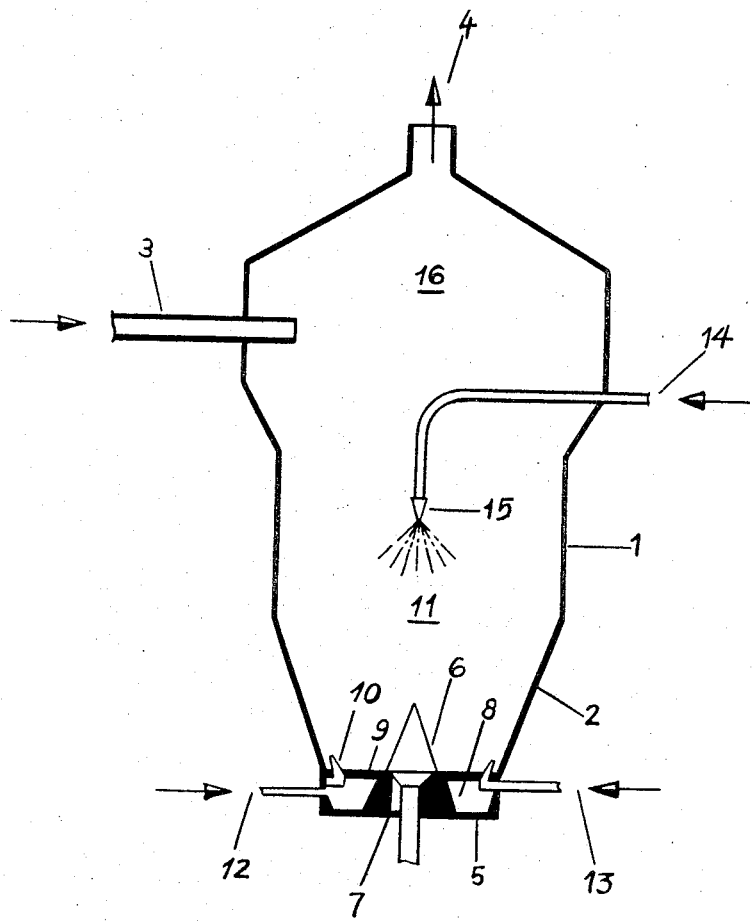

The invention relates to a process for the production of filling substances for galvanic elements especially for batteries or accumulators.

In the production of accumulator plates it is known to use lead monoxide, such as red lead and litharge or lead powder, which consists of fine pieces of lead monoxide and lead, as the starting material. The starting material is introduced for the reaction either dry or mixed with water displaced by dilute sulfuric acid so that a pasty mass is produced which attachedly is housed in a lead grid. For effecting the designated reaction as a mixing process there has been used previously mechanical mixers which either operate continuously or in a batch process.

By examination of the pasty masses produced by the known process it has been determined that the mechanical apparatus employed, such as a mixing or a kneading flap, a radial mixer, mixing screws, edge runners, etc., do not suffice to attain the mixing in which the single components are uniformly distributed, especially if large amounts have been added to the sulfuric acid. This leads therefore to the conclusion that the mixing speeds attainable in the production of the pasty masses during or at least at the end of the process are very much smaller than the reaction speed between lead monoxide and sulfuric acid. For the attainment of a satisfactory homogeneity the pasty masses therefore must be united in the reaction phase for more or less lengthy post-mixing times.

In the hitherto known process difficulties arise also in the removal from the reaction zone of the heat generated, for example, by the reaction between the lead monoxide and the sulfuric acid, since with mechanical mixing the heat only can indirectly dissipate from the walls of the mixing holder or the mixing devices. Localized overheating in the pasty mass leads, especially with additions of large amounts of sulfuric acid, unavoidably to the building up of agglomerates through which the originally provided particle size of the lead dust is deranged. The consequence of building up agglomerates are crumply or granular masses with poor pasty characteristics. The removal of the built-up agglomerate requires considerable shearing power and only succeeds with difficulty and incompletely with the additional use of edge runners and long mixing times.

The pasty masses produced by the hitherto known processes must be worked immediately, since if they stand for even a short period, as is not avoidable with the batch process, physical and chemical changes take place in the pasty masses, which influence disadvantageously the subsequent paste condition, especially with use of high speed machines. Changes in the chemical composition and in the physical characteristics are not excluded by use of continuous mixing, especially with interruptions in the machines disposed for the paste production. Prior conditioning of the pasty mass is thus not possible.

The present invention consists basically of the provision of a process for the production of filling masses which are completely homogeneous and of unlimited holdability and keeping capacity.

The problem has now been solved by a process for production of filling masses for galvanic elements through reaction of the reactive material in which water is free, which is characterized by the fact that all the reactive material mixed in powdered or mist form state is introduced at the dew point to the reaction, and thereby the steam is carried out in a gas stream and then a pulverized reaction product is attained.

In the process according to the invention thus the building up of a pulp or a paste is avoided, since the transposition and mixing of the lead powder with the sulfuric acid is carried out under such conditions that the water existing as a result of the reaction and the water carried in a given case with the sulfuric acid is immediately evaporated. The evaporated water is immediately removed through introduction to or conduction of a gas stream, preferably an air stream, through the reaction mixture. The reaction temperature can in any case be held solely by the heat freed by the reaction to a suitable value since the reaction between the lead monoxide and the sulfuric acid is heavily exothermic and also in any case further exothermic reactions take place, for example oxidation of the metallic lead. In case the heat generated in the reaction is not sufficient, additional heat must be added from the outside, for example, through use of a heated air stream.

Whether the dew point is exceeded or not depends at a given temperature upon the shared water and air quantities, that is, upon the temperature and moisture content of the air used for carrying away the steam. Through suitable measurement of the parameters influencing the dew point the reaction is so controlled that it exceeds the requirements based upon the dew point. For carrying out the process according to the invention mechanical, preferably pneumatic, mixers are used. The sulfuric acid is sprayed on the mechanically or pneumatically moved mixing bed. The steam is carried off through introduction of an air stream into the mixing bed.

The pulverized filler material obtained by the process of the invention can be used for filling from tubes or table plates and then in known manner an after treatment, such as dipping and drying, or handling with superheated steam is applied. The powdered form of material obtained can also be brought to paste form by addition of water and in the usual manner can be formed into a grid electrode. The production of the paste can be carried out in a continuously operating mixer to which the pulverized filling mass is conveyed by a feeding apparatus. The feeding apparatus and the continuously operating mixer can be controlled by the machine serving for introduction of the paste into the grid plate.

Figure 2:
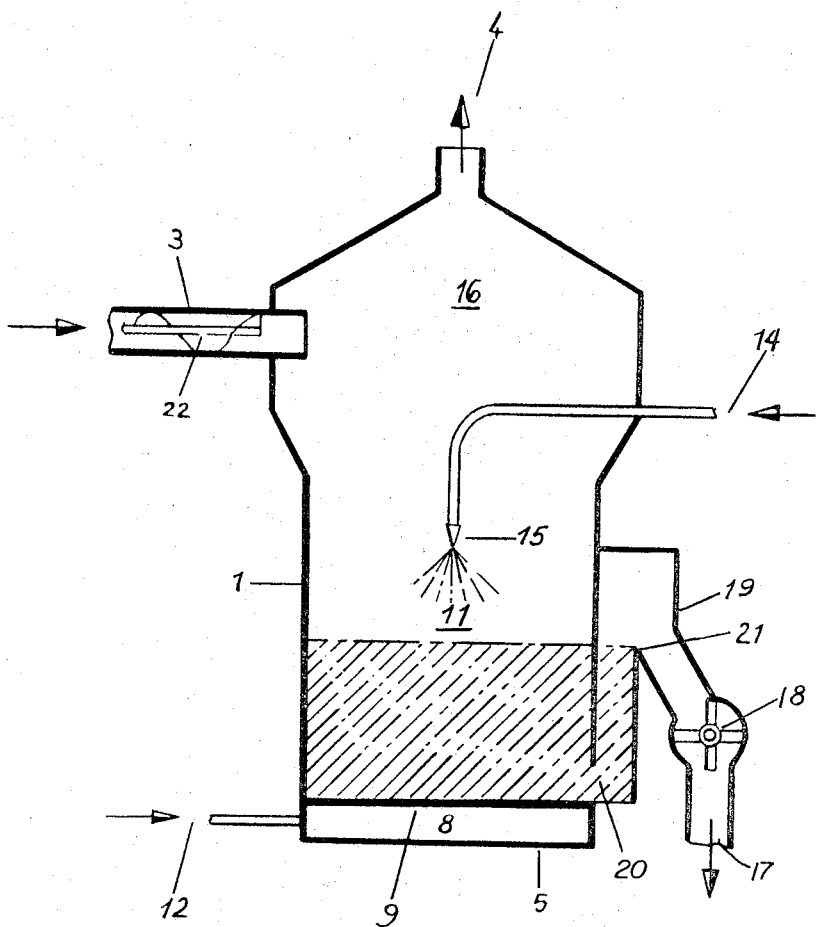

Suitable apparatus for carrying out the process of the invention will be more explicitly explained in connection with the attached drawings in which:

FIG. 1 is a diagrammatic sectional view of one embodiment of an intermittently operating pneumatic mixer for practicing this invention; and FIG. 2 is a diagrammatic section through one embodiment of a continuously operating pneumatic mixer for practicing this invention.

The mixer illustrated in FIG. 1 consists of a mixing vessel 1 which is conical at its lower end and into which the pulverized reaction material can be fed through a pneumatic duct 3. In the upper part of the vessel an exhaust opening 4 is provided. For removal of the reaction product there is provided in the center of the base 5 of the mixing container an exhaust opening 7 normally closed by a valve or a conical closure 6. The opening 7 is surrounded by an annular space 8 which communicates through a porous annular cover plate 9 and/or annularly arranged nozzles 10 with the chamber 11 of the mixing container 1.

The annular space 8 is supplied by a duct 12 with compressed air. The nozzles 10 can be supplied with compressed air, if occasion arises, by its own duct 13. The fluid starting material is fed by a duct 14 to a nozzle 15 which is disposed in the chamber 11 of the mixing container over the exhaust opening 7. The compressed air introduced through the porous plate 9 and/or nozzle 10 is released in the widened upper part 16 of the mixing holder 1 so that the pulverized material carried with it can again sink to the bottom, and dissipates finally through the outlet opening 4 and an adjacent dust filter (not shown) to atmosphere.

The mixer illustrated in FIG. 2 is similar to the mixer shown in FIG. 1. Parts corresponding to one another are designated by the same reference numerals. Instead of the exhaust opening 7 which is closed by the conical seal 7 (FIG. 1), in the mixer of FIG. 2, a port 17 is provided for the continuous removal of the mixing goods which contains a rotary, partitioned valve 18 which is connected with the container 1 by a side outlet 19 provided over a porous plate 8. The height of the mixing bed 20 is determined by an overflow baffle 21. The pulverized starting material is introduced continuously with the help of a conveyor screw 22 provided in the forwarding duct 3.

The process according to the invention will now be more clearly explained by the following examples.

EXAMPLE 1

For production for example of an accumulator mass for negative electrodes there is used ball-milled lead products which show the following characteristic data:

| | | |
|---|---|---|
| PbO content | percent | 74.6 |
| Bulk weight | kg./l | 2.06 |
| Water capacity | ml./kg | 142 |
| Particles size over 100μ | percent | 27.6 |
| Particle size over 40μ | do | 68.2 |

50 kg. of this lead powder is advanced with 1% of pulverized fluxing material (expander) and in a mechanically quickly operating mixer, whose mixing mechanism operates according to the counterflow principle and thereby is disposed so that the pulverized lead to be mixed is whirled at high speed by the same and thereby experiences fine division. After five minutes of dry mixing time 2.15 liters of accumulator sulfuric acid of a specific gravity 1.40/20° C. is sprayed by spray apparatus onto the powdered lead at a pressure of five atmospheres. The spraying is so regulated that the acid is uniformly fed for a five-minute period. The development of heat at the end of the acid introduction attains a temperature of 58° C., its high point. Care is taken for the free withdrawal of the developed steam.

After the acid has been sprayed without stoppage the mixing process is continued for three minutes longer, whereby the total mixing time is held to about fifteen minutes for the 50 kg. charge. The now pulverized and dry finished mixture is mixed for the purpose of further work with about 5.0 liters of water (distilled) and is transformed with about 50% reduced machine rotation speed within five minutes to a pasty mass.

EXAMPLE 2

There is used the mixer illustrated in FIG. 1. The starting product was ball-milled lead powder with the following characteristic data:

| | | |
|---|---|---|
| PbO content | percent | 64 |
| Bulk weight | kg./l | 2.07 |
| Water capacity | ml./kg | 158 |
| Particle size over 100μ | percent | 24.8 |
| Particle size over 40μ | do | 65.2 |

50 kg. of this lead powder, which in the present case was used for the preparation of a positive electrode mass, was fed to the mixing chamber 11 by the pneumatic lead powder filling duct 3. This lead powder was fluidized then through introduction of compressed air at three to four atmospheres through the porous annular bottom 9 of the container chamber in order that a standing lead powder flow bed of about ⅔ of the container height may build up until it was the height of the spray nozzle 15. For control of the compressed air nozzles 10 which operate at an air pressure of six atmospheres gusts of the air at uniform intervals of two seconds were supplied to the chamber thereby providing the existing flow bed with rhythmic whirls. The lead powder highly whirled in this manner, through this arrangement is supplied into very fine particles into contact with the acid spray nozzles 15.

The accumulator sulfuric acid used for the production of the described mixture with a specific gravity of 1.40/20° C. was now provided in an amount of 4.30 liters at a pressure of five atmospheres by the duct 14 and the spray nozzle 15 delivers the whirling lead powder during a period of ten seconds. The elevated reaction temperature achieved by this operation attains a maximum value of 66° C. The steam built up exhausts with the exhausting compressed air through the exhaust duct 4 and a filter attached thereto of about 3.5 qm. filter surface. After uninterrupted spraying of the sulfuric acid the mixing was resumed for three minutes time, then the compressed air was stopped and the mixed material is emptied through the bottom valve 6 in the container. In consequence of the complete dryness of the mixed material it is in a sprinkleable stage whereby a quick and complete emptying of the mixing container is possible.

The total used working time for preparation of the above-described 50 kg. charge of the accumulator mass comprises fifteen minutes.

EXAMPLE 3

By use of the mixer shown in FIG. 2 the continuous production of an accumulator mass for a positive electrode was achieved. The starting product was a ball-milled lead powder with the following characteristics:

| | | |
|---|---|---|
| PbO content | percent | 65 |
| Bulk weight | kg./l | 2.02 |
| Water capacity | ml./kg | 155 |
| Grain size over 100μ | percent | 22.5 |
| Particle size over 40μ | do | 66.0 |

For carrying out the mixing process this lead powder was fed through the duct 3 of the mixing apparatus and was transported into the interior of the container by the feed screw 22 with a constant feed capacity of 10 kg./min. This feed speed was held unchanged during the total mixing operation. Simultaneously with the beginning of the lead powder infeed compressed air was supplied by air duct 12 to the porous sieve bottom 9 of the mixing container from the underside. The pressure was so regulated that after five minutes of operation of the feed screw 22, which corresponds to a fed amount of 50 kg. of lead powder, the height of the whirling bed lay in the same plane with the overflow baffle 21 of the exhaust apparatus 17.

On this account the sulfuric acid was also sprayed at five atmospheres pressure by means of duct 14 into the mixing chamber so that the lead powder particles which are first carried into the mixing chamber are sprayed with sulfuric acid. The speed of the entry of the sulfuric acid is suited to the fed quantity of lead powder so that on 50 kg. of lead powder 4.3 liters of accumulator sulfuric acid of a specific gravity 1.40/20° C. are used.

The analogy of the continuous lead powder feed to the finished mixture falling onto the overflow damper 21 was controlled by the valve 18 and from it was carried at regular intervals to the exterior which is possible, thanks to the dryness of the descending substance and their good sprayability.

The reaction temperature of the apparatus attained after fifteen minutes working time is a uniform value of 53° C.

The steam built up is expelled by the exhausting air pressure through the opening 4 and an attached filter having a filter surface of about 3.5 qm.

The approximately 1,200 kg. accumulator mass produced in this manner is divided into two different parts for further work thereon:

(1) About 600 kg. of the continuously produced accumulator mass is immediately transported, joined by water supplement, to a further process step in a pasty state and is formed into the electrode grid.

(2) Further about 600 kg. of the mass produced in the same manner is stored away and taken out after being deposited for ten days for further work, without any disadvantage for the performance of the further working process or the quality of the electrodes produced.

While the invention has been described in connection with particular embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A process for the production of filling materials for galvanic elements by reaction of starting material containing some free water, comprising introducing the starting material into a reaction vessel, in powdered or mist form, at the dew point, spraying the material with an acid to produce an exothermic reaction and to generate steam and carry off the steam in a gas stream, thereby to obtain a pulverized form reaction product.

2. A process according to claim 1 wherein air is used as the gas stream.

3. A process according to claim 2 wherein the moisture content in the reaction zone of the amount of water carried by the starting material and the amount, moisture and temperature of the introduced air stream and the temperature in the reaction zone are so adjusted with reference to the amount of free water as not to be below the dew point in the reaction zone.

4. A process according to claim 1, wherein the pulverized reaction product is brought into paste form by addition of water and the paste is formed into a battery grid plate.

5. A process according to claim 1, wherein the starting material is a powdered lead compound, and is sprayed within the reaction vessel with sulfuric acid, the vessel is heated to transform the water freed from the lead compound and from the sulfuric acid into steam, and a gas is forced through the vessel to carry the steam out of the vessel, and the powdered reaction product is removed from the vessel.

6. A process according to claim 1, wherein the starting material is a powdered lead compound, and is sprayed in the reaction vessel with sulfuric acid, so that the free water in the material and water from the sulfuric acid are transformed into steam by the heat generated, and compressed air is forced through the vessel to carry out of the vessel the steam.

References Cited
UNITED STATES PATENTS

| | | | |
|---|---|---|---|
| 988,963 | 4/1911 | Barton | 136—26 XR |
| 1,382,282 | 6/1921 | Gabel | 136—26 |
| 1,524,314 | 1/1925 | Schaeffer et al. | 136—26 |
| 1,888,823 | 11/1932 | Hall | 23—146 |
| 2,981,776 | 4/1961 | Dunn et al. | 136—27 |
| 3,244,562 | 4/1966 | Coppersmith et al. | 136—26 |

ALLEN B. CURTIS, *Primary Examiner.*

A. SKAPARS, *Assistant Examiner.*

U.S. Cl. X.R.

23—146; 136—65